United States Patent [19]

Lyon et al.

[11] Patent Number: 4,569,723

[45] Date of Patent: Feb. 11, 1986

[54] SALT RECOVERY FROM ALUMINUM BLACK DROSS

[76] Inventors: John P. Lyon, 3524 SW. 325th St., Federal Way, Wash. 98003; Nace E. Halpin, 20715 Marine View Dr. SW., Seattle, Wash. 98166

[21] Appl. No.: 541,365

[22] Filed: Oct. 12, 1983

[51] Int. Cl.[4] ............................................. B01D 1/18
[52] U.S. Cl. ..................... 159/48.1; 159/DIG. 38; 23/302 T
[58] Field of Search ........ 159/45, 48.1, 45 R, 159/DIG. 38; 75/24, 93 AC; 83/301, 702 J, 304

[56] References Cited

U.S. PATENT DOCUMENTS

| | | | |
|---|---|---|---|
| 2,635,684 | 4/1953 | Joscelyne | 159/48.1 |
| 2,646,343 | 7/1953 | Bennett et al. | 23/90 |
| 2,671,009 | 3/1954 | Lomstock | 23/90 |
| 2,979,421 | 4/1961 | Rissman et al. | 117/100 |
| 3,377,134 | 4/1968 | Baker et al. | 159/45 R |
| 3,394,995 | 7/1968 | Kloepfer et al. | 159/45 |
| 3,751,243 | 8/1973 | McLeod | 75/24 |
| 4,033,760 | 7/1977 | Lanie et al. | 75/24 |
| 4,040,820 | 8/1977 | Loach et al. | 75/24 |
| 4,060,118 | 11/1977 | Papafingos et al. | 159/45 |
| 4,073,644 | 2/1978 | Papafingos et al. | 75/24 |
| 4,368,070 | 1/1983 | Fracchia | 75/24 |
| 4,379,718 | 4/1983 | Grantham et al. | 426/466 |

OTHER PUBLICATIONS

Mullin, Crystallization, p. 282, CRC Press, 1972.

*Primary Examiner*—Hiram H. Bernstein
*Attorney, Agent, or Firm*—Seed and Berry

[57] ABSTRACT

Sodium and potassium chloride consolidated granular salt crystals are formed on a bed of granular salt by spraying, for example, the clarified brine of aluminum black dross upon the heated bed. The bed cascades in a revolving drum and is maintained at a temperature of about 250°–350° F. (121°–177° C.). That is, the bed is maintained at a temperature high enough to evaporate the water from the brine before the brine penetrates the bed and low enough to eliminate entrainment of salt in the evaporated water. An apparatus and process for the recovery of this salt product are claimed.

6 Claims, 3 Drawing Figures

SALT RECOVERY FROM ALUMINUM BLACK DROSS

DESCRIPTION

1. Technical Field

The present invention relates to a process and apparatus for recovering salt from a brine, and, more particularly, to recovery of NaCl—KCl salt from aluminum black dross brine.

2. Background Art

Large quantities of salt, such as sodium and potassium chloride, is added to smelter furnaces, especially in recycling aluminum. This salt accumulates atop the melt and forms a black dross which often is discarded. Both the aluminum or other metal in the dross and the salt are valuable by-products which are recoverable. Large quantities of the aluminum, for example, may be recovered by crushing the dross to separate th aluminum-rich fractions. Still, the remaining salt-rich fractions are usually discarded, since it is uneconomical to reclaim the salt.

Several processes are known for reclaiming the salt. One such process involves evaporating the water from the dross brine to crystallize separately the sodium and potassium chloride. The recovered salt is, thus, a mixture of sodium and potassium chloride wherein the separate crystals are either pure sodium or pure potassium chloride. This evaporation process has also been improved by subjecting the entire brine mixture to a reduced pressure, thereby reducing the boiling temperature of the mixture. Several problems are associated with this reclamation process, however, particularly (1) the enhanced corrosive nature of the black dross brine as it is concentrated to saturation, and (2) the large consumption of energy to boil the large volumes of water involved. With this process, the product is a mixture of separate salt crystals of sodium and potassium chloride rather than a salt having consolidated granules containing both NaCl ad KCl. The separate crystals have a higher melting point than the melting temperature of a eutectic crystal (40% NaCl-60% KCl) or of any other blended consolidated granule. Energy is wasted to melt the reclaimed salt in the smelter, unless consolidated granules are used.

DISCLOSURE OF INVENTION

The present invention relates to a process and apparatus for the recovery of salt from a brine, particularly for the recovery of NaCl—KCl consolidated salt granules from aluminum black dross brine. The method involves crystallizing the brine on a substrate by evaporating the water from the brine. This process is usually conducted in a revolving drum where the brine is sprayed onto a seed bed of salt crystals. The revolving drum is heated with waste heat from the smelting furnace to a temperature high enough to evaporate the water from the brine without the water penetrating the bed and at a temperature low enough to substantially eliminate entrainment of salt in the evaporated water. That is, the brine is sprayed onto the salt bed in the drum and the water of the brine is evaporated as the salt bed cascades in the drum (much like drying clothes). The bed is preferably maintained at a temperature between about 250°–350° F. (121°–171° C.). The product is a granule having a salt composition equal to the concentration of the several salts in the brine. Crystals of separate salts are not formed.

This process saves substantial amounts of energy because the resulting product is a crystal which melts below 1500° F. (and as low as 1200° F.) rather than separate crystals of sodium chloride and potassium chloride (which have higher melting points). The process is particularly adapted for using waste heat from the smelting operation and requires little additional energy to evaporate the brine. The process also reduces corrosion problems encountered with other processes. The brine is sprayed onto a dry bed of salt and is crystallized in the bed so that the surface of the drum is never wetted with the brine. The dry crystals have little or no corrosive effect upon the soft steel of the drum, and so the corrosion problem is virtually eliminated. The drum is hot enough that, should brine penetrate the bed, film boiling will occur at the drum and its surface will not be wetted.

While the process is best conducted by spraying a brine of aluminum black dross salt onto a granular salt bed, the method and apparatus of the present invention may be used for recovery of salt from any brine. To allow the product to be added directly to an aluminum smelter, for example, without contaminating the melt, the substrate upon which the brine is sprayed must be compatible with the components of the smelting operation. It has been found that using salt crystals for the bed is the most effective way of providing a compatible surface for the deposition of salt from the brine.

BEST MODE FOR CARRYING OUT THE INVENTION

Figure 1:
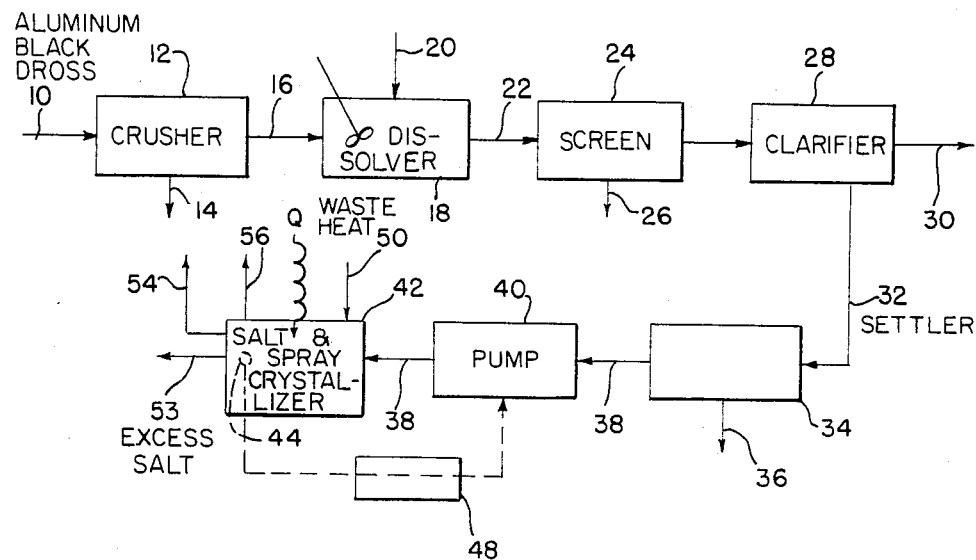
FIG. 1 is a schematic flow diagram of the process of the present invention.

Aluminum black dross is a by-product of aluminum smelting. NaCl—KCl salt may be reclaimed from aluminum black dross in a simple process. The black dross 10 enters a crusher 12 or a stage of crushers of the jaw and roll type where aluminum-rich chunks 14 of the dross are removed and where the dross 10 is pulverized. The pulverized dross 16 enters a dissolver 18 where water 20 is added to form an aluminum black dross brine 22. The water 20 and pulverized dross 16 may be agitated to improve the rate of dissolution. Ordinarily, the dissolver 18 is a modified ready-mix concrete tank which is revolved to agitate the mixture. Of course, other dissolving techniques may be used.

The brine 22 passes through a screen 24 where aluminum-rich concentrates 26 are removed before the brine enters a clarifier 28 having an oxide screw to remove coarse oxides 30 which pass through the screen 24 but which settle in the clarifer 28. The clarified brine 32 then passes to a settling tank 34 where fine oxides 36 are removed and a clear brine 38 is created.

The clear brine 38 passes through a pump 40 and is injected into a crystallizer 42 where water in the brine 38 is evaporated to form consolidated salt crystals. A thermocouple 44 in the crystallizer 42 measures the temperature of a heated salt bed 46 (FIG. 2) on which the brine 38 is sprayed, and transmits an electrical signal proportional to the temperature to a controller 48 which proportionally adjusts the rate of injection of the brine 38 from the pump 40.

The crystallizer 42 has a revolving drum whose exterior sheath is heated with waste heat 50 drawn from an aluminum smelter furnace. The sheath, in turn, transfers the heat through stirring fins 52 to the salt bed 46 to provide sufficient heat to evaporate water in the brine 38, thereby forming the salt crystal product 53 and a water vapor stream 54. The waste heat 50 is then purged.

Figure 2:
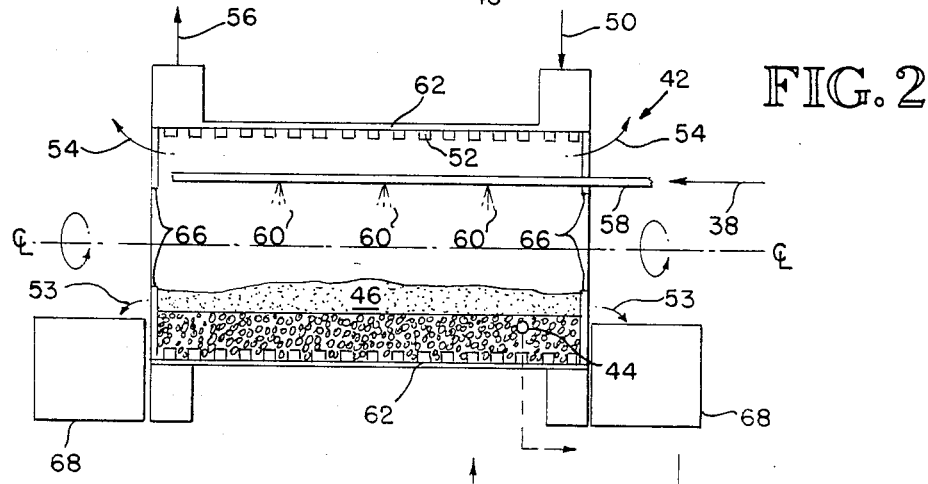
FIG. 2 is a schematic cross-sectional representation of the primary crystallizer of the process of the present invention.

As shown in FIG. 2, clear brine 38 passes through a pipe 58 having a plurality of Floodjet nozzles available from Spraying Systems (such as the ¼K15 stainless steel nozzle providing a very wide, deflector-type, flat spray pattern at low impact). These nozzles 60 are positioned along the pipe 58 to define three separate zones within the drum of the crystallizer 42. Each zone may be controlled separately. The nozzles 60 are periodically cleaned by flushing them with fresh water.

Figure 3:
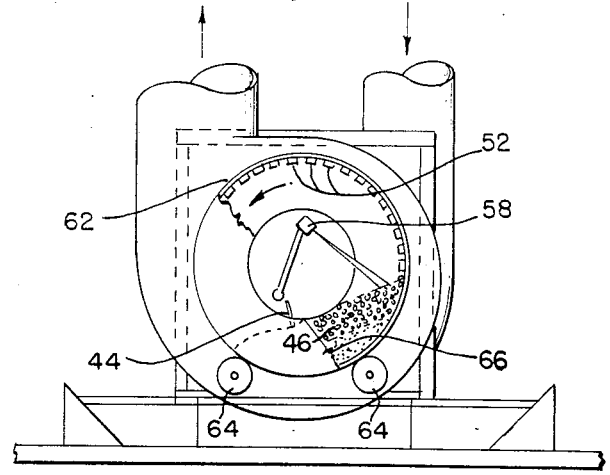
FIG. 3 is a schematic end view of the crystallizer of FIG. 2.

As shown in FIG. 3, each nozzle 60 directs a fine spray in a line upon the upper portion of a crescent-shaped salt bed 46 within the drum 62. The drum 62 rests on a plurality of rollers 64 and is driven to revolve at approximately 2 rpm. The internal sheath of the revolving drum 62 has a plurality of stirring fins 52 which are used for heating and stirring the salt bed 46. Generally, each fin 52 is a rectangular sheet of plate metal welded to the inner sheath of the revolving drum 62 and angled slightly away from a radial cross-section of the drum 62. At one end, the stirring fins 52 are directed to move the salt bed 46 toward the right; while at the other end, the fins 52 are positioned to move the salt to the left. Therefore, the revolving drum leads to stirring of the salt bed 46 forwardly and backwardly along the drum 62.

The salt bed 46 is usually made of 3/16-inch, generally spherically pellets of consolidated product salt having a composition of approximately 60% sodium chloride and 40% potassium chloride. The crystals match the composition of the input brine, except at start-up where the substrate is a mixture of separate crystals of KCl and NaCl. The spray of the nozzles 60 is directed near the top of the cascade of the salt bed 46 along the entire length of the drum. A thermocouple 44, or a plurality of thermocouples (if desired), is supported on a beam 57 from the pipe 58 to extend into the salt bed 46 at a lower portion of the crescent. The thermocouple 44 monitors the temperature of the bed to insure that the bed is at a temperature high enough to evaporate the water from the salt brine before the water penetrates the bed and low enough to substantially eliminate entrainment of salt in the evaporated water. It is important that the temperature of the salt bed 46 be high enough to avoid penetration, so that the brine 38 may be dried in a drum that does not use stainless steel. By evaporating the brine in the bed, a concentrated salt brine never wets the inner surface of the drum and corrosion is substantially eliminated. Stated differently, the bottom surface of the crescent-shaped bed, as viewed, for example, in FIG. 3, is in contact with heated cylinder; the top surface of the crescent-shaped bed forms a chord in the cylinder, with the bed crystals or particles cascading from the high side of the top surface to the low side of the top surface; and the spray from the nozzles impinges upon the top surface of the crescent-shaped bed at the high side near the beginning of the cascade. The evaporation is completed before the cascading bed crystals reach the wall of the cylinder at the low side of the top surface of the bed. The thermocouple or thermocouples monitor the bed temperature near the low side of the top surface to assure that the bed temperature is high enough to evaporate the water before it reaches the wall of the cylinder. The temperature of the bed 46 must be low enough, however, that the rate of evaporation is low enough that salt is not entrained with the water vapor 54 escaping from the drum 62. Since the salt is the desired product, it would be wasteful to evaporate the water at such a high rate that a large portion of the desired product is lost in a gaseous waste stream. Tests for aluminum black dross brine have shown that the preferred temperature range for the bed 46 is between about 250° F. and 350° F. (121°–177° C.), and more preferably between about 280°–290° F. (138°–143° C.).

The thermocouple 44 monitors the temperature of the salt bed 46 to generate an electrical signal which is transmitted to a controller 48. The controller 48, cognizant of the temperature of the bed 46, adjusts the injection rate of brine 38 into the crystallizer 42 to maintain the desired temperature of the bed 46. That is, should the temperature of the bed 46 rise, the controller 48 will cause the pump 40 to inject a higher volume of brine 38 into the crystallizer 42 so that more heat will be dissipated with the evaporation of water from the brine 38 in the salt bed 46. On the other hand, should the thermocouple 44 detect a drop in temperature of the bed 46, the controller 48 will respond to the change in the electrical signal and will slow the pump 40 so that the rate of injection of brine 38 into the crystallizer 42 will be reduced. The rate of input of heat from the waste heat 50 into the sheath is maintained at a constant rate, and only the rate of brine injection is adjusted to regulate the temperature within the desired limits.

Preferably, the revolving drum is seven feet in diameter and is 36 feet long. The outer sheath can be adapted to have a plurality of fins to enhance heat exchange between the input waste heat 50 and the metal sheath. The inner sheath, as already described, preferably has a plurality of stirring fins 52 which cascade the salt bed 46 and transfer heat efficiently to the salt bed 46.

Weirs 66 are fashioned onto each end of the drum 62 to automatically regulate the volume of the salt bed 46. That is, as the drum 62 revolves and as the bed 46 cascades, excess salt 52 will fall out of the drum over the weir 66 into suitable containers 68. For a typical drum usually about 20,000 lbs. of salt crystals are needed to make up the bed 46.

The bed 46 is fluidized by cascading within the revolving drum 50. The bed 46 is salt because the salt may be directly added to the aluminum or magnesium smelting process to help form black dross in the melt. For the process to be effective, the brine must deposit its salt on a substrate as the water evaporates. The salt adheres to the substrate so strongly that the only practical way for its removal is to dissolve the salt. Since the object of the invention is to recover the salt from a brine, however, redissolving the salt would be foolhardy. The substrate and salt must be usable as a product; therefore, a salt bed of either (1) of consolidated salt crystals, (2) of separate salt crystals of a salt in the brine, or (3) of another substrate which may be fed directly to the aluminum smelter without contamination of the melt is suitable. The bed 46, for example, could be made of aluminum crystals or a non-contaminating substance, such as carbon or graphite, but consolidated salt crystals are highly preferred.

The waste heat 50 to heat the drum 62 generally is taken from the aluminum smelting furnace at a temperature of approximately 1200° F. and exits the drum at approximately 500° F. This stream 50 heats the drum surfaces sufficiently so that, should water penetrate the salt bed 96, the elevated temperature of the drum will immediately result in film boiling of the water at the drum rather than weting of the drum. The high temperature of the drum, then, also allows the use of carbon steels rather than stainless steels because corrosive wetting is not encountered. As previously described, however, it is desirable that the temperature of the salt bed be maintained high enough to eliminate, if at all possible, the penetration of concentrated brine through the bed.

The process and apparatus of the present invention are an effective way to evaporate water from a concentrated salt brine without encountering corrosion problems. More particularily, the process and apparatus are an effective means for reclaiming eutectic salt from aluminum or magnesium black dross where the salts are otherwise discarded. The process efficiently uses energy available in smelting and reduces the energy requirements of the entire recycled aluminum process.

Although described in regards to a revolving drum, it is possible that another type of fluidized bed could be used to hold the substrate. Those skilled in the art will recognize these alternatives which would allow sufficient input of thermal energy to evaporate the brine prior to its penetration.

EXAMPLE

For 8,800 lbs (4,000 kg) of aluminum cans fed to a recycling smelter, approximately 7,480 lbs (3,400 kg) of raw aluminum is immediately recovered. Paint, water, and other impurities are burned away during the smelting. Aluminum black dross is created during the smelting. The major component of the dross is eutectic salt (60% NaCl-40% KCl) added to the melt to purify the melt. Approximately 1500 lbs of salt are in this dross, and this salt can be recovered with the salt saver apparatus of the present invention.

While a preferred embodiment for recovering salt from aluminum black dross has been shown and described in this application, those skilled in the art will readily recognize modifications and alternatives which may be used in the process or apparatus without departing from the inventive concept. For example, the flow rate of waste heat 50 may be controlled along with the rate of injection of brine 38 to better control the temperature of the bed 46. Brines other than aluminum black dross brine may be evaporated to recover the salt, such as magnesium black dross brine or any other salt solution. The claims should, therefore, be construed liberally in light of this description and should be limited only as is necessary in light of the pertinent prior art.

We claim:

1. A process for recovering salt from a brine, comprising:
   tumbling a bed of salt crystals within a heated environment to maintain a heated, exposed, upper bed surface by confining the bed in a cylinder and rotating the bed about a horizontal axis of the cylinder;
   heating the environment with a source of heat separated from the bed so that the environment exposed to the bed is not contaminated by the source of heat;
   measuring the temperature of the bed directly from within the bed;
   spraying the brine onto the exposed upper bed surface to form new crystals as the sole source of replenishment of the bed while spraying;
   controlling the quantity of spray onto the bed surface in response to the temperature sensed in the bed so as to maintain the upper surface of the bed at a temperature high enough to evaporate all of the liquid in the brine without liquid penetrating deeply into the bed and at a temperature low enough to substantially eliminate entrainment of salt in the evaporated liquid; and
   wherein the tumbling forms a crescent-shaped bed, as viewed from an end of the cylinder, the temperature of the bed is measured near the surface of the bed near the lower end of the crescent, the bottom surface of the crescent-shaped bed is in contact with the heated cylinder, the top surface of the crescent forms a chord in the cylinder, with the bed crystals cascading from the high side of the top surface to the low side of the top surface, the spray impinges upon the top surface of the crescent at the high side near the beginning of the cascade, and the evaporation is completed before the cascading bed crystals reach the wall of the cylinder at the low side of the top surface.

2. The process of claim 1 wherein the temperature of the bed upper surface is between 250°-350° F.

3. The process of claim 1 wherein the temperature of the bed upper surface is between 280°-290° F.

4. The process of claim 1 wherein the step of heating the environment includes passing a flow of waste heat along the outside of the cylinder so that the bed is heated by conduction through the cylinder and not exposed directly to the flow of waste heat.

5. The process of claim 1 wherein the bed is formed of NaCl—KCl salt.

6. The process of claim 1 wherein the spray is a broad, flat spray pattern directed at low impact upon the exposed top surface of the bed.

* * * * *